United States Patent [19]

Lenhart

[11] Patent Number: 5,365,919
[45] Date of Patent: Nov. 22, 1994

[54] SOLAR ENERGY COLLECTOR ASSEMBLY

[76] Inventor: James L. Lenhart, 4721 Carr St., Wheatridge, Colo. 80033

[21] Appl. No.: 992,929

[22] Filed: Dec. 18, 1992

[51] Int. Cl.⁵ .................................. E04D 13/18
[52] U.S. Cl. ........................... 126/629; 126/631; 126/652; 126/655
[58] Field of Search ............ 126/629, 630, 631, 632, 126/906, 677, 400, 651, 652, 655, 656, 674, 670

[56] References Cited

U.S. PATENT DOCUMENTS

| | | | |
|---|---|---|---|
| 3,859,980 | 1/1975 | Crawford | 126/271 |
| 4,016,860 | 4/1977 | Moan | 126/270 |
| 4,094,300 | 6/1978 | Young | 126/677 |
| 4,126,121 | 11/1978 | Fairbanks | 126/270 |
| 4,151,828 | 5/1979 | Mather | 126/270 |
| 4,153,042 | 5/1979 | Tragert | 126/271 |
| 4,175,541 | 11/1979 | Midgley | 126/630 |
| 4,203,420 | 5/1980 | Schoenfelder | 126/270 |
| 4,279,242 | 7/1981 | Bogatzki | 126/655 |
| 4,304,222 | 12/1981 | Novinger | 165/174 |

*Primary Examiner*—James C. Yeung
*Attorney, Agent, or Firm*—John E. Reilly

[57] ABSTRACT

In a solar collector assembly, one or more absorber tubes are made up of a plurality of discarded metal can bodies in end-to-end relation, one or more collector tubes are made up of a plurality of discarded transparent pop bottles arranged in end-to-end relation to one another and in surrounding relation to the absorber tubes. A blower is positioned in one of the absorber tubes to force air through the absorber tube and through a discharge conduit into a space to be heated.

13 Claims, 1 Drawing Sheet

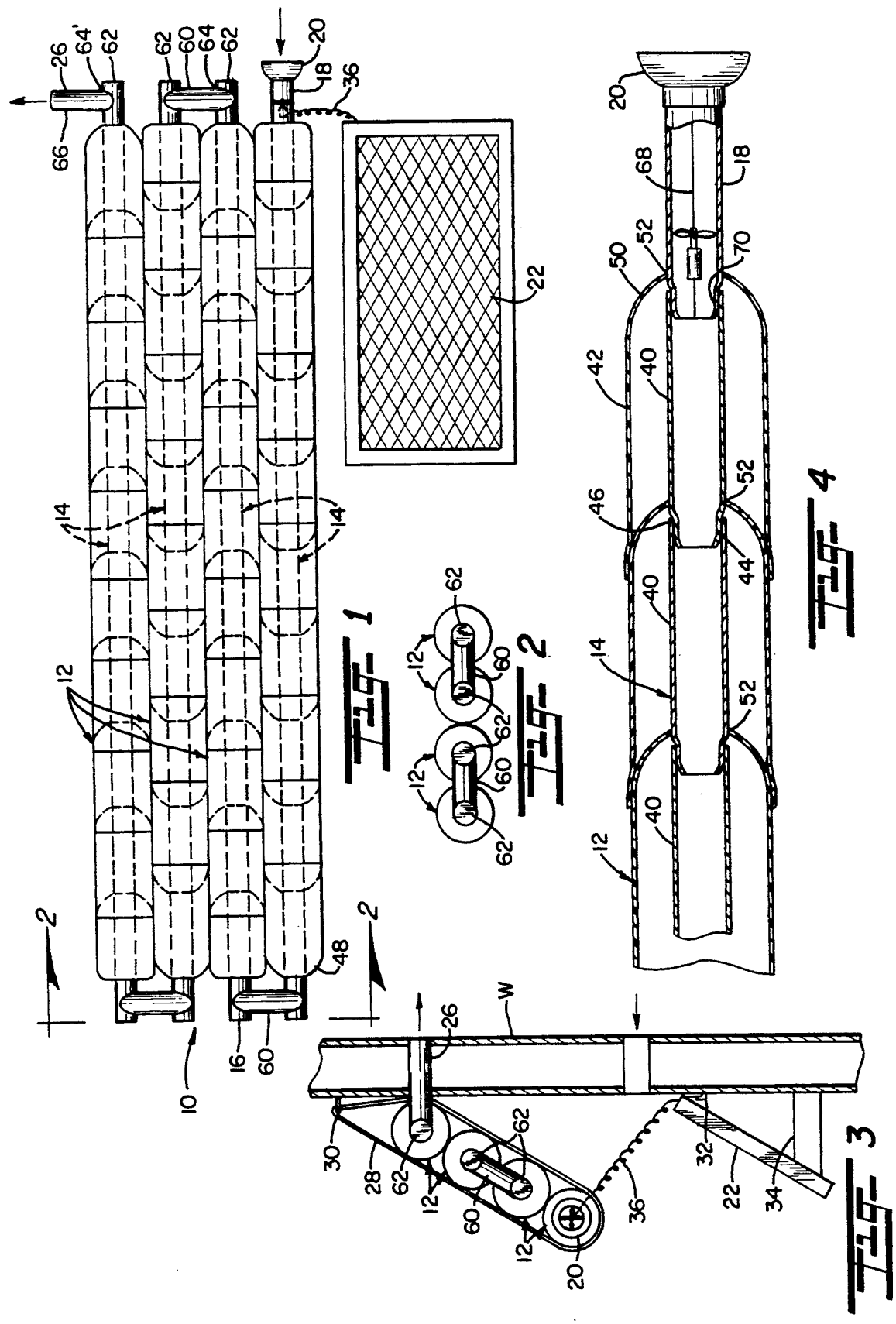

SOLAR ENERGY COLLECTOR ASSEMBLY

This invention relates to solar collector systems and more particularly relates to a novel and improved active solar energy air or other fluid heating system.

BACKGROUND AND FIELD OF INVENTION

Solar energy heat collectors customarily are made up of an outer transparent surface or enclosure and inner heat asborber tubes with outer heat-absorptive surfaces which are contained within or behind the collector surface. A heat transfer fluid, such as, air flows through the absorber tubes in order to transfer heat from the tubes and conduct into a space to be heated. An important factor in the design of such systems is to minimize the cost of construction and particularly the cost of materials required in the make-up of such systems.

Empty cans and bottles present a tremendous waste problem; yet, those articles have qualties which lend themselves extremely well to those required in a solar collector system. In the past, can bodies have been proposed for use as the inner heat absorber portion of a solar collector assembly. For example, in U.S. Pat. No. 4,175,541 to C. H. Midgley, a solar heating system is employed having a collector panel mounted behind a transparent surface with a plurality of beverage cans individually mounted in the collector panel so as to protrude at right angles from the panel and only the protruding ends of the cans are coated with a heat-absorbing paint, the opposite ends behind the panel being left uncoated to radiate the heat into a heat storage medium, such as, a pile of rocks. U.S. Pat. No. 4,094,300 to S. W. Young discloses a solar collector system having a series of sheet metal cans arranged in end-to-end relation, and a heat transfer liquid is pumped through the cans to transfer the heat to the interior of a building or to an appliance; however, the cans are not positioned within an outer transparent panel or housing. U.S. Pat. No. 4,279,242 to H. U. Bogatzki is directed to a solar heating system in which a series of bottle-shaped shells are arranged in end-to-end relation to one another and in offset relation to a slender tube having a reflective surface. Other representative patents are U.S. Pat. Nos. 3,859,980 to F. R. Crawford, 4,016,860 to K. L. Hoan, 4,126,121 to D. W. Fairbanks, 4,153,042 to W. E. Tragert, 4,151,828 to P. Mather et al, 4,203,420 to J. L. Schoenfelder and 4,304,222 to H. E. Novinger.

It is now proposed that a solar heating system be made up of a combination of discarded or waste metal cans and bottles and wherein the bottles are assembled as outer transparent support members for a series of cans that are similarly assembled in end-to-end relation within the bottles so as to serve as a means of conducting a heat transfer fluid into a space to be heated.

SUMMARY OF INVENTION

It is therefore an object of the present invention to provide for a novel and improved solar energy collector system which can be constructed almost entirely out of discarded materials and easily assembled into a modular unit of the desired size and capacity.

It is another object of the present invention to provide for a novel and improved solar energy collector assembly which is readily conformable for mounting at different locations on the exterior of a building or away from the building and is capable of meeting different size and heat capacity requirements of the building.

It is a further object of the present invention to provide for a novel and improved solar collector assembly which is lightweight, compact and is comprised of a minimum number of parts which can be readily assembled in a minimum of steps and is highly efficient and durable.

It is an additional object of the present invention to provide in a solar energy collector system for an array of collector and absorber tubes which can be comprised entirely of discarded materials.

In accordance with the present invention, a solar energy collector assembly has been devised which comprises a collector tube defined by a plurality of transparent, generally bottle-shaped members open at opposite ends and disposed in end-to-end relation to one another, an absorber tube having an external heat-absorptive surface disposed within said collector tube, the absorber tube being defined by a plurality of thin-walled metal can bodies open at opposite ends and disposed in end-to-end relation to one another, means mounting the absorber tube for axial extension through the collector tube, blower means for directing air through the absorber tube, and conducting means for conducting air from the absorber tube into a space to be heated.

In the preferred form, the absorber tube is coextensive with the collector tube, there being a plurality of passes or lengths of collector tubes and absorber tubes with generally U-shaped tubular returns interconnecting two tubular ends of adjacent pairs of the passes of absorber tubes, and the blower means being in the form of a fan disposed at one end of the absorber tubes opposite to one of the U-shaped returns.

A particular feature of the present invention resides in forming the absorber tubes out of discarded metal can bodies which have opposite top and bottom ends removed and interconnected to one another in end-to-end relation, and the collector tubes are made of discarded transparent pop bottles either of plastic or glass which have their opposite top and bottom ends at least partially removed and connected in end-to-end relation to one another as well as being disposed in surrounding relation to the can bodies. Moreover, the U-shaped return portions between adjacent passes of the absorber tubes are preferably made up of interconnected can bodies assembled at right angles to one another.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a front view in elevation of a preferred form of solar collector installation in accordance with the present invention;

FIG. 2 is an end view of the preferred form of invention illustrated in FIG. 1;

FIG. 3 is another enlarged end view illustrating in more detail the preferred form of solar collector tubing of the preferred form of invention; and FIG. 4 is an enlarged cross-sectional view of the preferred form of invention shown in FIGS. 1 to 3.

DETAILED DESCRIPTION OF PREFERRED EMBODIMENT

Referring in detail to the drawings, there is illustrated in FIGS. 1 to 4, a preferred form of solar collector assembly 10 which is broadly comprised of a plurality of collector tubes 12 and absorber tubes 14 supported within the collector tubes with a generally U-shaped return between adjacent ends of the absorber tubes 14, and a blower 18 is mounted at inlet end 20 of one of the absorber tubes 14. The blower 18 is driven by a standard photovolcaic cell 22 in order to force air as a heat-conductive fluid through the absorber tubes and the heated air is conducted through an upper discharge end 24 and discharge conduit 26.

For the purpose of illustration and not limitation, and as a setting for the present invention, the preferred form of collector assembly 10 comprises a series of four passes or lengths of collector tubes 12 and absorber tubes 14 for mounting on the wall W of a building, as illustrated in FIG. 3. The air discharge conduit 26 is connected to the discharge end 24 for extension through the wall W into the interior of a building, not shown. In order to suspend the assembly 10 from the wall W, one or more chain or strap members 28 may be disposed at spaced intervals along the length of the assembly 10, each member 28 being formed into an endless loop and secured by a conventional hanger bracket 30 to the wall W of the building so that the assembly 10 is inclined downwardly and outwardly away from the wall W as shown. Similarly, the photovoltaic cell 22 may be mounted by means of a standard hanger bracket 32 and horizontal support 34 so as to angle downwardly and outwardly away from the wall W, and electrical conductor wires as represented at 36 extend from the cell 22 into the fan motor housing at the inlet end 20.

Considering in more detail the construction and arrangement of the preferred form os assembly 10, an important feature of the present invention resides in the utilization of discarded metal can bodies 40 in the makeup of the absorber tube 14, as shown in FIG. 4; and the collector tubes 12 are defined by discarded glass or plastic bottles 42. For instance, the can bodies 40 may be made out of 12 oz. aluminum cans and the discarded bottles 42 made out of 2-liter clear plastic bottles. Each can body 40 may, for the purpose of illustration, be a beverage can having a rounded bottom end and a top tapered end. Each can is first cleaned, and the top of the can is cut off approximately one inch below the rim. In turn, the bottom of the can is cut off one inch above the lowermost edge so as to define an open-ended body with a tapered end 44 at the top and a straight cylindrical end 46 at the bottom. The tapered end 44 of the conventional can as described will slide or snugly fit into the straight end 46 so that a series of cans may be wedged together in end-to-end relation to one another to define the desired length of an absrber tube 14. The adjoining ends made up of the tapered end 44 inserted into a straight end 46 may be bonded together by any suitable means, such as, by applying an adhesive at the joints. A series of absorber tubes of the desired length are made up as described, following which a heat-absorptive coating is applied to the tubes 14. A typical coating is a flat black paint which is applied in one or more coats to the outer surfaces of the cans 40.

The outer collector tubes 12 are formed by cleaning the plastic bottles 42 and removing their labels so as to be completely transparent. Typically, each plastic bottle 42 includes a closed bottom end which is tapered as represented at 48, and the top of the bottle is tapered as at 50 into a neck portion of the type which is threaded or otherwise formed to receive a hole of sufficient diameter. The bottom tapered end 48 is cut off to define a hole of sufficient diameter to receive the tapered end 50 at the top of a next bottle in succession. Correspondingly, the top end 50 is cut off to remove the neck and to leave an opening 52 which is slightly larger than the diameter of the can bodies making up the absorber tube 14. The bottles 42 are then assembled in end-to-end relation over each array of cans 40 making up an absorber tube 14 so that the tapered ends will serve as axially or longitudinally spaced supports along the substantial length of the absorber tube 14, allowing a limited length of a can 40 at the end of each absorber tube to extend past the end of the outer collector tube 12.

In order to assemble the U-shaped returns or end connectors 16, a can body 60 has both ends cut off to form a straight cylindrical wall section; and two other can bodies 62 have their tops cut off as described in relation to the cans 40 but the bottom ends are left intact or closed. However, a circular opening 64 is formed in each can wall near its bottom end and which is of a size to permit insertion of the opposite ends of the can 60. In a similar manner, one or more cans may be assembled end-to-end to define the discharge conduit 26 and inserted into a sidewall opening 64' of a can 62' projecting from the upper discharge end of the absorber tube 12, as illustrated in FIG. 1.

In the preferred form of invention, the duct 18 at the inlet end of the lowermost absorber tube 14 is constructed out of a plastic bottle so as to reduce the temperature level surrounding the fan and to employ once again discarded material to the extent possible in the assembly construction. For this purpose, a plastic bottle is cut off at both ends to form a straight cylindrical wall and the bottle is cut lengthwise as indicated at 68 with one edge placed in overlapping relation to the other so as to reduce the effective diameter to a size which can be inserted into the open end of the can 40 nearest to the inlet end. The upper end of the bottle which was removed from the housing portion 18 is then formed into the bellmouth or inlet 20 by cutting off the neck end to form an opening size which will snugly fit onto the end of the housing. The overlapping edges along the cut-off line as well as the mouth 20 are connected together by the application of a silicone adhesive or other suitable bonding agent. Preferably, that end of the bottle for the housing 18 which is inserted into the can end is slightly reduced in diameter as at 70 to snugly fit into the end of the can and is connected together using a bonding agent as described. Any suitable form of bracket may be utilized to mount the fan motor in the housing 18.

The collector assembly is completed by applying sealant between the collector tubes 12; i.e., along the contacting interface or surfaces between each pair of collector tubes, particularly if it is desired to utilize the assembly as a stand-alone unit without other securing means, such as, the straps or chains 28 illustrated in FIG. 3. Further, although an array of four collector tubes 12 and absorber tubes 14 is illustrated in FIGS. 1–4 it will be apparent that one or more tubes 12 and 14 may be utilized according to the capacity desired and site of intended installation and use. Moreover multiple assemblies 10 may be interconnected by direct connection of the end 24 to the inlet end 20 of a second collector assembly instead of connection into a discharge duct 66. Of course, the second assembly would have its discharge duct 66 extending into the space to be heated. Nevertheless, from tests conducted a single unit as shown in the preferred form has been more efficient than two or more separate assemblies connected in series. Although the unit has been described specifically for use with air as the heat-conductive medium, it will be evident that other fluids can be used.

It is therefore to be understood that the above and other modifications and changes may be made in the construction and arrangement of parts comprising the preferred form of invention as well as its intended use without departing from the spirit and scope of the invention as defined by the appended claims and reasonable equivalents thereof.

I claim:

1. A solar collector assembly comprising:
   a collector tube defined by a plurality of transparent, generally bottle-shaped members, each said bottle-shaped member provided with openings at opposite ends which are substantially symmetrical with a longitudinal axis of said collector tube, said bottle-shaped members disposed in end-to-end relation to one another;
   an absorber tube having an external heat-absorptive surface disposed within said collector tube and defined by a plurality of thin-walled can bodies open at opposite ends and disposed in end-to-end relation to one another;
   means for mounting said absorber tube for axial extension through said collector tube wherein a longitudinal axis of said absorber tube is substantially coincident with said longitudinal axis of said collector tube;
   air-directing means for directing air through said absorber tube; and
   conducting means for conducting fluid from said absorber tube into a space to be heated.

2. A solar collector assembly according to claim 1, said collector tube extending the substantial length of said absorber tube.

3. A solar collector assembly according to claim 1, including a plurality of passes of said collector tube and said absorber tube, a tubular return interconnecting terminal ends of each adjacent pair of passes of said absorber tube, said air directing means disposed at one end of one of said absorber tubes opposite to one of said returns.

4. A solar collector assembly according to claim 3, each of said tubular returns being generally U-shaped and comprising a plurality of can bodies connected at right angles to one another.

5. A solar collector assembly according to claim 1, each of said can bodies being of hollow, generally cylindrical configuration and each of said bodies having a tapered end at one end wedged into an opposite end of each next successive can body.

6. A solar collector assembly according to claim 1, each of said bottle-shaped members being of hollow, generally cylindrical configuration and having a tapered end at one end inserted into an opposite end of each next successive bottle-shaped member.

7. A solar collector assembly according to claim 6, including a plurality of lengths of said collector tube and said absorber tube, and means for joining said plurality of lengths of said collector tubes in juxtaposed relation to one another.

8. A solar collector according to claim 7, including support means for supporting said plurality of lengths of said collector tubes and said absorber tubes on an external surface of a building.

9. In a solar collector assembly, the improvement comprising:
   an absorber tube defined by a plurality of discarded metal can bodies, each can body having opposite top and bottom ends removed, said bodies connected in end-to-end relation to one another with the top of each body inserted into the bottom of each next body in succession;
   a collector tube defined by a plurality of discarded transparent pop bottles, each of said bottles having opposite top and bottom ends removed to define openings therein substantially symmetrical with a longitudinal axis of each said bottle, said bottles connected in end-to-end relation to one another and in surrounding relation to said can bodies with the top of each bottle inserted into the bottom of each next bottle in succession, and a longitudinal axis of said can bodies being substantially coincident with said longitudinal axis of said bottles; and
   each of said bottles having a tapered end with an innermost terminal edge of a diameter substantially corresponding to the diameter of one of said can bodies, and means for joining said inner terminal end of each said bottle to one of said can bodies.

10. In a solar collector assembly according to claim 9, including a heat-absorptive coating on external surfaces of said can bodies.

11. In a solar collector assembly according to claim 9, said collector tube extending for the substantial length of said absorber tube.

12. In a solar collector assembly according to claim 9, including a plurality of lengths of said collector tube and said absorber tube, a tubular return interconnecting terminal ends of each adjacent pair of lengths of said absorber tube, and blower means disposed at one end of one of said absorber tubes for directing a heat conducting fluid through said absorber tubes and said returns.

13. In a solar collector assembly according to claim 12, each of said tubular returns comprising a plurality of can bodies interconnecting said terminal ends of each adjacent pair of said lengths of said absorber tubes.

* * * * *